United States Patent [19]

Chin et al.

[11] Patent Number: 4,843,285

[45] Date of Patent: Jun. 27, 1989

[54] VERTICAL TRACKING CIRCUIT

[75] Inventors: Lin T. Chin, Hsin Chu, Taiwan; James A. Wilber, Indianapolis, Ind.

[73] Assignee: Thomson Consumer Electronics, Inc., Princeton, N.J.

[21] Appl. No.: 215,184

[22] Filed: Jul. 5, 1988

[51] Int. Cl.[4] .................... H01J 29/76; H01J 29/70
[52] U.S. Cl. ..................... 315/408; 315/411
[58] Field of Search ............. 315/408, 411, 403, 370, 315/371, 383; 358/190

[56] References Cited

U.S. PATENT DOCUMENTS 4,547,708 10/1985 Haferl ................... 315/371

OTHER PUBLICATIONS

Schematic diagram of a Hitachi television Chassis CT1955, dated 1986 and published by the Hitachi Corporation.
Data sheet for an integrated circuit LA7621, pp. 1009–1011.

Primary Examiner—Thomas H. Tarcza
Assistant Examiner—Gregory C. Issing
Attorney, Agent, or Firm—Eugene M. Whitacre; Joseph J. Laks; Sammy S. Henig

[57] ABSTRACT

A regulator coupled to the main supply voltage generates a B+ scan voltage for a horizontal flyback transformer of a horizontal deflection circuit. A supply voltage is developed from a trace voltage in a flyback transformer secondary winding. The supply voltage is indicatiave of the horizontal deflection current amplitude. A decrease in mains supply voltage that cannot be compensated by the regulator, causes a corresponding decrease in the B+ scan and supply voltage and in a horizontal deflection current amplitude. The supply voltage is applied to the series arrangement of first and second resistors and a zener diode. A control voltage developed from the supply voltage, at a junction of the first and second resistors, is applied to a control terminal of a vertical deflection circuit for controlling the amplitude of the vertical deflection current. A decrease in the control voltage produces a greater proportional decrease in the vertical deflection current. The resulting decrease in the supply voltage causes a smaller proportional decrease in the control voltage. This enables the proportional decrease in vertical deflection current to be the same as that of the horizontal deflection current of providing raster width-to-height tracking.

23 Claims, 1 Drawing Sheet

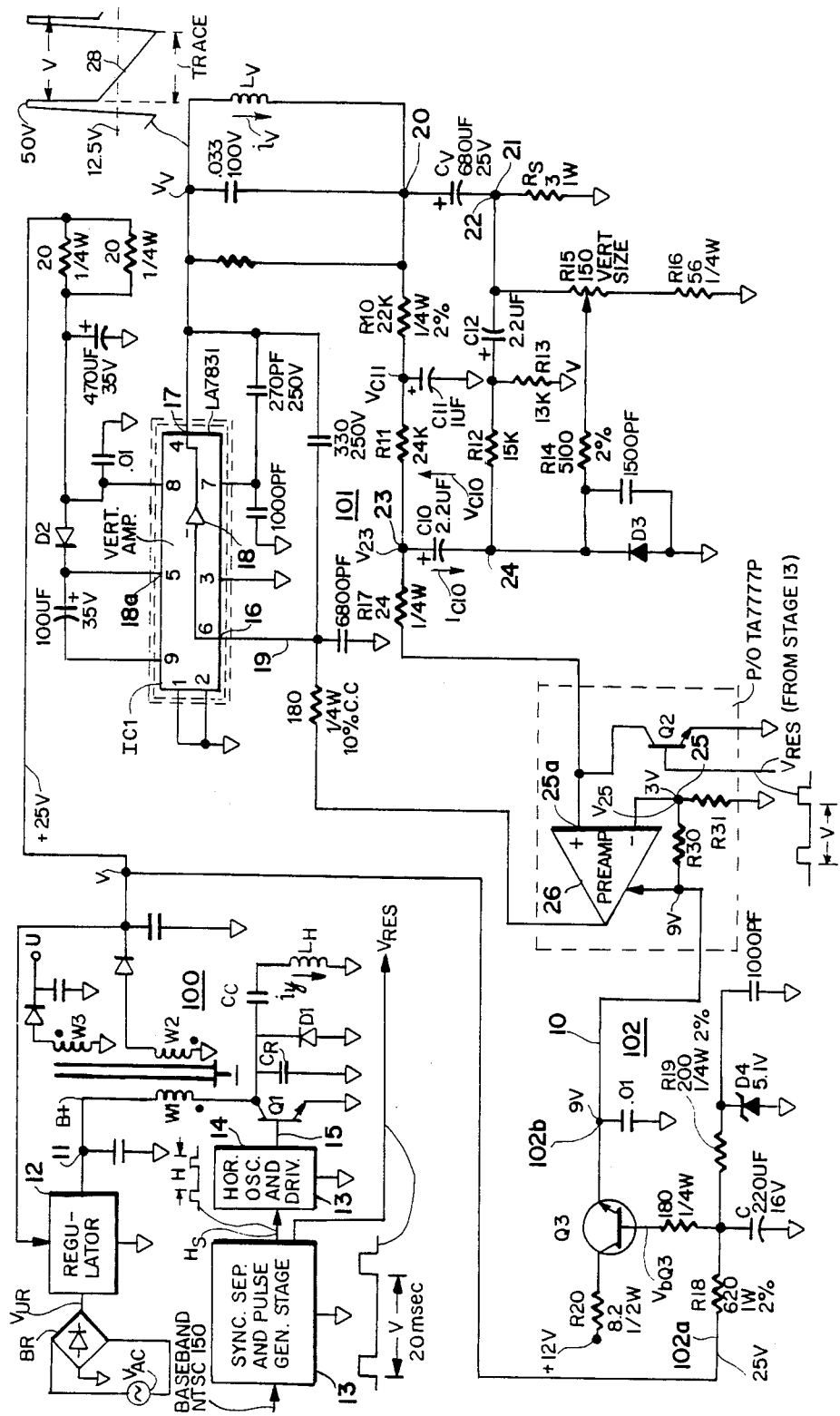

4,843,285

VERTICAL TRACKING CIRCUIT

The invention relates to a control circuit of a deflection circuit in which an amplitude of a deflection current varies in accordance with a control voltage.

In a typical television receiver, for example, a B+ voltage is applied to a primary winding of a horizontal flyback transformer for energizing a horizontal deflection circuit that generates a deflection current in a horizontal deflection winding. An ultor voltage is provided from a high voltage retrace pulse voltage developed in a tertiary winding of the flyback transformer.

An AC mains supply voltage provides an input power to a power supply regulator that produces the B+ voltage at a regulated nominal value. When regulation operation is normal, a change in the mains supply voltage may have only a negligible effect on the B+ voltage. However, when the mains supply voltage is lower than a lower limit of a nominal range, the regulator may not be capable of stabilizing the B+ voltage at the same nominal value as when the mains supply voltage is within its normal range. The result is a decrease in the horizontal deflection current amplitude. Consequently, the raster width will decrease relative to when the AC mains supply voltage is within its normal range.

To prevent an undesired change in the horizontal-to-vertical proportional dimension of an image that is displayed on the CRT, it may be desired to decrease a vertical deflection current in a vertical deflection winding, when, for example, the aforementioned decrease in the B+ voltage occurs. In this way, the same proportion of such image that is displayed on the CRT is maintained after the decrease in the B+ voltage occurs.

In a deflection circuit, embodying an aspect of the invention, a control voltage, produced from a trace voltage during a horizontal trace interval that is developed in a secondary winding of the flyback transformer, is applied to a control terminal of a vertical deflection circuit. The control voltage controls the amplitude of the vertical deflection current. A decrease, for example, in the B+ voltage causes a corresponding decrease in the control voltage that, in turn, causes a decrease in the amplitude of the vertical deflection current that is proportional to the decrease in the amplitude of the vertical deflection current. The decrease in the control voltage tends to reduce the aforementioned raster distortion in the proportional dimensions.

In a deflection circuit, embodying an aspect of the invention, that includes a Miller feedback arrangement, a given decrease in the control voltage results, proportionately, in a larger decrease in the vertical deflection current. It may be desirable to provide a better compensation so as to prevent the aforementioned raster distortion in the dimensional proportions of the displayed image that occurs when the B+ voltage decrease. To that end, it may be desirable to decrease the aforementioned control voltage proportionally less than the decrease in the B+ voltage. Thus, better compensation of the vertical deflection is provided than had the proportional decrease of both been, for example, the same.

A television deflection apparatus, embodying an aspect of the invention, includes a source of a first supply voltage and a horizontal deflection circuit coupled to the first supply voltage. The deflection circuit generates a horizontal deflection current in a horizontal deflection winding at an amplitude that changes when a change in the first supply voltage occurs. A first control voltage that is indicative of an amplitude of the horizontal deflection current is generated. The first control voltage changes when the change in the horizontal deflection current occurs. A vertical deflection circuit responsive to a second control voltage that varies with the change in the horizontal deflection current produces a vertical deflection current in a vertical deflection winding. The vertical deflection current is at an amplitude that is determined in accordance with the change in the amplitude of the horizontal deflection current. A change in the second control voltage causes the vertical deflection current to proportionally change by an amount that is different from the proportional changes in the second control voltage. When the change in the horizontal deflection current occurs, the proportional change in the second control voltage is different from the proportional change in the horizontal deflection current.

The sole FIGURE illustrates vertical and horizontal deflection circuits and a control voltage generating circuit, embodying an aspect of the invention.

The sole FIGURE illustrates a horizontal deflection circuit 100 that generates an output supply voltage V that is applied, via a control voltage generating circuit 102, embodying an aspect of the invention, to a vertical deflection circuit 101.

In circuit 100, an AC mains supply voltage $V_{AC}$ is coupled to a bridge rectifier BR. Rectifier BR generates an unregulated supply voltage $V_{UR}$ that is coupled to a regulator 12. Regulator 12 generates a regulated B+ voltage at a terminal 11. Horizontal deflection circuit 100 includes a flyback transformer T having a primary winding W1 that is coupled between output terminal 11 of regulator 12 and between a collector electrode of a horizontal transistor switch Q1, operating at a horizontal deflection rate. The collector of transistor 01 is also coupled in a conventional manner to a horizontal deflection winding $L_H$, to a retrace capacitor $C_R$ and to a damper diode D1.

A baseband television signal 150 obtained from a video detector, not shown in the FIGURE, is coupled to a stage 13 that includes a sync separator. The sync separator generates a signal $H_s$ containing the horizontal synchronizing information of signal 150. Signal $H_s$ is applied to a horizontal oscillator and driver stage 14 that produces a horizontal rate control signal 15 for controlling the switching operation of transistor Q1 that is synchronized to signals $H_s$ and 150.

As a result of the switching operation of transistor Q1, an ultor voltage U is generated from a corresponding retrace voltage developed in a tertiary winding W3 of flyback transformer T and a supply voltage V of, for example, +25 volts is developed from a corresponding trace voltage developed at a secondary winding W2. Each of voltage V, voltage U and a deflection current $i_y$ in winding $L_H$ is directly proportional to the B+ voltage.

As long as voltage $V_{AC}$ is within a predetermined normal range, the B+ voltage that is regulated is substantially the same. Outside the normal range, and in particular, below a lower limit of the normal range of voltage $V_{AC}$ that is required by regulator 12, the B+ voltage, and hence voltage V, and currente $i_y$, are at corresponding levels that are smaller than when voltage $V_{AC}$ is within the normal range. The proportional change in each of voltages V and U and of current $i_y$ is approximately the same.

In vertical deflection circuit 101, that operates as a Miller feedback arrangement, supply voltage V is applied to a supply voltage receiving terminal 18a of an integrated circuit (IC) ICI, such as the IC LA7831, manufactured by Sanyo Corporation. Integrated Circuit ICI includes a vertical amplifier 18 having a push-pull driver stage. Amplifier 18 is responsive to an input signal 19 produced in a negative feedback loop at an inverting input terminal 16. An output terminal 17 of amplifier 18 is coupled to one end terminal of a vertical deflection winding $L_V$ that conducts a deflection current $i_v$. A second end terminal, a terminal 20, of winding $L_V$ is coupled through a DC blocking capacitor $C_V$ to a deflection current sampling resistor $R_s$ that is coupled to a common potential, referred to herein as ground. During each vertical trace interval trace, a voltage 22 developed at a terminal 21 across resistor $R_2$ is a downramping voltage that changes in a sawtooth manner and that is indicative of the waveform current $i_v$.

Resistors R10 and R11 that provide a DC feedback in deflection circuit 101 are coupled in series between terminal 20 and between a terminal 23 of a Miller integrating capacitor C10. A capacitor C11 that provides S-correction is coupled between ground and a junction terminal of resistors R10 and R11. A resistor R12 and a capacitor C12 are coupled in series between a second terminal 24 of capacitor C10 and terminal 21 of resistor $R_s$ to provide linearity correction. A resistor R13 is coupled between ground and a junction terminal of resistor R12 and capacitor C12. A diode D3 that provides a fast discharge path for discharging capacitor C10 during vertical retrace is coupled between terminal 24 and ground. A resistor R14 is coupled between terminal 24 and a wiper terminal of a resistor R15 to provide vertical size control. Resistor R15 forms with a resistor R16 a series arrangement that is coupled across resistor $R_s$.

A pulse generator that is included in stage 13 generates vertical rate signal $V_{RES}$, in accordance with the corresponding vertical synchronization pulses of signal 150. A transistor switch Q2 operates at a vertical rate in accordance with vertical rate signal $V_{RES}$. A collector electrode of transistor Q2 is coupled via a resistor R17 to terminal 23 of capacitor C10. The emitter electrode of transistor Q2 if grounded. Resistor R17 controls a discharge rate of capacitor C10 during vertical retrace that is partially discharged when transistor switch Q2 is conductive. A terminal of resistor R17 that is remote from terminal 23 of capacitor C10 is coupled to a noninverting input terminal of a pre-amplifier 26. Pre-amplifier 26 has an output terminal that is coupled to input terminal 16 of amplifier 18 to complete the negative feedback loop.

Supply voltage V that is generated in circuit 100 is also applied to a control terminal 102a of control voltage generating circuit 102, embodying an aspect of the invention, that generates a control voltage 10 at an output terminal 102b. Voltage 10 is couple via a resistive voltage divider formed by resistors R30 and R31 to an inverting input terminal 25 of pre-amplifier 26 for developing a control voltage $V_{25}$ that controls the amplitude of vertical deflection current $i_v$. Voltage 10 is coupled to a supply voltage receiving terminal of pre-amplifier 26 for energizing pre-amplifier 26. Pre-amplifier 26, resistors R30 and R31 and transistor Q2 are included in an IC TA7777P made by Toshiba Corp.

When transistor switch Q2 becomes conductive and vertical retrace is initiated, capacitor C10 is discharged through transistor switch Q2 ⓒ resistor R17 and forward biased diode D3. The forward voltage of diode D3 develops a voltage $V_{c10}$ in capacitor C10 having an initial nonzero voltage at the end of retrace. Transistor Q2 becoming nonconductive, in accordance with signal $V_{RES}$, causes vertical trace to begin. During vertical trace, capacitor C10 is charged via resistor R11.

Assume, for the sake of explanation, that a voltage $V_{c11}$ in capacitor C11 remains the same during the entire vertical deflection interval. Although such assumption ignores a variation of voltage $V_{c11}$ that provides S-correction, such variation is relatively small. Voltage $V_{c11}$ is applied to capacitor C10 during a given vertical trace, to generate a current $i_{c10}$ that charges capacitor C10 during the vertical trace. Due to the negative feedback arrangement, a voltage $V_{23}$ at terminal 23 of capacitor C10 that is coupled to a noninverting input terminal of pre-amplifier 26 is maintained substantially equal to voltage $V_{25}$ developed at inverting input terminal 25 of pre-amplifier 26. Voltages $V_{23}$ and $V_{25}$ are equal because of the low offset voltage of pre-amplifier 26. Since voltages $V_{25}$ and $V_{c11}$ are constant in a given vertical trace, voltage $V_{c10}$ across capacitor C10 increases in a generally upramping, linear manner. To maintain the voltages at the input terminals of pre-amplifier 26 substantially the same, the feedback arrangement causes vertical amplifier 18 to generate a downramping portion 28 of a vertical sawtooth voltage $V_v$. Voltage $V_v$ produces deflection current $i_v$ that flows in winding $L_v$. Vertical current $i_v$ develops corresponding voltage 22 across resistor $R_s$ that is a downramping voltage. The sum of downramping voltage 22 applied to the bottom of capacitor C10 and unramping voltage $V_{c10}$ in capacitor C10 is maintained constant by the negative feedback loop, as described before. Consequently current $i_v$ also changes in a linear manner, in accordance with the rate of change of voltage $V_{c10}$. The rate of change of voltage $V_{c10}$ is determined by the level of current $i_{c10}$. Current $i_{c10}$ is determined by the voltage at terminal 24 of capacitor C10.

The initial nonzero value of voltage $V_{c10}$ in capacitor C10, after transistor Q2 becomes nonconductive, is determined by the forward voltage drop of diode D3, as explained before. That initial nonzero value of voltage $V_{c10}$ causes current $i_{c10}$ been zero.

As a result of the negative feedback, a smaller value of voltage $V_{25}$ at terminal 25 of pre-amplifier 26 caused by a decrease of the B+voltage will cause the voltage at terminal 24 of capacitor C10, at a given instant of vertical trace such as immediately after transistor Q2 turns off, to be smaller than prior to such decrease in voltage $V_{25}$. However the reduction in the voltage at terminal 24 is proportionally, larger in magnitude than in voltage $V_{25}$. The proportional reduction in the voltage at terminal 25 is larger because the voltage at terminal 24 is less positive than voltage $V_{25}$ as a result of the level shifting caused by the initial nonzero value of voltage $V_{c10}$. Consequently, current $i_{c10}$ and deflection current $i_v$ will decrease by a larger proportional decrease than voltage $V_{25}$. If follows that a decrease in voltage $V_{25}$, resulting from, for example, a decrease in the B+voltage, causes proportionally a larger decrese in the amplitude of vertical deflection current $i_v$.

Since voltage V decreases proportionally the same as the B+voltage induced decrease in horizontal deflection current $i_y$, it may be desirable to decrease control voltage 10, proportionally, less than the proportional decrease in voltage V. In this way, the decrease in vertical deflection current $i_v$ becomes porportionally equal to that of horizontal deflection current $i_y$ for maintaining the width-to-height ratio of an image on the raster constant.

To obtain the aforementioned ratio constant, supply voltage V is coupled to a series arrangement of resistors R18 and R19 and a zener diode D4. A junction terminal between resistors R18 and R19, operating as a voltage divider of voltage V, is coupled to a base electrode of a transistor Q3. Transistor Q3 operates as an emitter follower. Control voltage 10 is developed at the emitter of transistor Q3, in accordance with a base voltage $V_{bQ3}$. Voltage $bQ3$ is approximately equal to the sum of the voltage across zener diode D4 and of the voltage across resistor R19. In this way control voltage 10 includes a first portion that remains constant when voltage V changes and a second portion that changes when voltage V changes. Thus supply voltage V operates as a control voltage of circuit 102.

Assume, hypothetically, that mains supply voltage $V_{AC}$ decreases below a lower required for proper regulation in regulator 12. Consequently, the B+voltage will have a value that is lower than the nominal value obtained during normal operation. Therefore, the value of each of deflection current $i_y$ and supply voltage V will decrease in a corresponding proportion that is approximately the same for each and that is referred to hereinafter as the first proportion. The decrease in current $i_y$ will cause the length of an electron beam sweep in the horizontal direction on the CRT, not shown in the FIGURE, during a corresponding portion of each of the scan lines in which an image is displayed to decrease as well. If the length of the electron beam sweep in the vertical direction in which the image is displayed during a corresponding portion of vertical trace does not decrease in the same proportion as current $i_y$, a proportionality distortion will occur. In order to prevent such distortion in a horizontal-to-vertical length ratio of the image that is displayed on the CRT at such low mains supply voltage $V_{AC}$, it may be desirable to decrease the amplitude of vertical current $i_v$, proportionally, the same as the aforementioned first proportion. In this way, the horizontal-to-vertical length ratio of the displayed image will remain the same despite the decrease in the B+voltage.

In accordance with an aspect of the invention, circuit 102 generates control voltage 10 that decreases proportionally less than the aforementioned first proportion. In this way, the aforementioned effect on the image proportion caused by diode D3 is compensated.

The ratio between the values of resistors R18 and R19 and the value of the voltage across zener diode D4 provide two circuit parameters that may be, for example, empirically selected for maintaining unchanged the required horizontal-to-vertical length ratio of the displayed image at two corresponding levels of voltage V. One level of voltage V may be selected to be the nominal or normal operation value. The second one may be selected to be the value that corresponds with a predetermined low amplitude of voltage $V_{AC}$. When voltage V assumes a value that is between the aforementioned two levels of voltage V, compensation is also obtained. Advantageously, the compensation provided by circuit 102 is better than were control voltage 10 to change proportionally the same as the change in the B+voltage.

What is claimed:

1. A television deflection apparatus, comprising:
a source of a first supply voltage;
a horizontal deflection circuit coupled to said first supply voltage for generating a horizontal deflection current in a horizontal deflection winding at an amplitude that changes when a change in said first supply voltage occurs;
means for generating a first control voltage that is indicative of an amplitude of said horizontal deflection current and that changes when said change in said horizontal deflection current occurs;
a vertical deflection circuit responsive to a second control voltage that varies with the change in said horizontal deflection current for generating a vertical deflection current in a vertical deflection winding at an amplitude that is determined in accordance with the change in said amplitude of said horizontal deflection current, such that a change in said second control voltage causes said vertical deflection current to proportionally change by an amount that is different from the proportional change in said second control voltage; and
means responsive to said first control voltage for generating said second control voltage such that when said change in said horizontal deflection current occurs, the proportional change in said second control voltage is different from the proportional change in said horizontal deflection current, the difference between the proportional change of said horizontal deflection current and that of said second control voltage compensating for the difference between the proportional change of said vertical deflection current and that of said second control voltage.

2. An apparatus according to claim 1 wherein the change in an amplitude of said vertical deflection current is, proportionally, substantially the same as said change in said horizontal deflection current amplitude when said first supply voltage changes, for preventing said change in said horizontal deflection current amplitude from causing a change in a horizontal-to-vertical length ratio of a displayed image.

3. An apparatus according to claim 1 wherein said vertical deflection current decreases, proportionally, more than said second control voltage and said second control voltage decreases, proportionally, less than said first supply voltage.

4. An apparatus according to claim 3 wherein said horizontal deflection current decreases, proportionally, substantially the same as said first supply voltage.

5. An apparatus according to claim 1 wherein said horizontal deflection circuit comprises a flyback transformer, wherein said first control voltage generating means is responsive to a first trace voltage developed at a first winding of said flyback transformer for generating siad first control voltage, that is a DC voltage, and that changes, proportionally, the same as a change of said first trace voltage.

6. An apparatus according to claim 1 wherein said second control voltage generating means comprises a voltage divider having a first terminal that is coupled to said first control voltage and a second terminal that is coupled to a predetermined third control voltage and wherein said second control voltage is developed at a terminal of said voltage divider.

7. An apparatus according to claim 6 wherein said third control voltage is developed across a zener diode.

8. An apparatus according to claim 6 wherein said voltage divider comprises first and second resistors that are coupled in series.

9. An apparatus according to claim 1 wherein said vertical deflection circuit comprises a Miller feedback arrangement.

10. An apparatus according to claim 1 wherein said vertical deflection circuit comprises, differential amplifying means having an output terminal that is coupled to said vertical deflection winding, a sampling resistance coupled to said amplifying means for generating a sawtooth third voltage that is indicative of an amplitude of said vertical deflection current, a first capacitance having a first terminal that is coupled to said sampling resistance and a second terminal that is coupled to a first input terminal of said amplifying means, said amplifying means having a second input terminal that is coupled to said second control voltage and switching means responsive to a signal at a frequency that is related to a vertical deflection frequency for periodically discharging said first capacitance.

11. An apparatus according to claim 10 wherein said switching means comprises a diode that is coupled at a first junction terminal between said first capacitance and said sampling resistance.

12. An apparatus according to claim 11 wherein said switching means further comprises a switch coupled to said second terminal of said first capacitance that is remote from said first junction terminal.

13. An apparatus according to claim 10 further comprising, a DC blocking second capacitance coupled to said vertical deflection winding for developing a DC voltage that is coupled to said second terminal of said first capacitance for supplying a current that charges said first capacitance and for providing a DC negative feedback in said vertical deflection circuit.

14. An apparatus according to claim 10 wherein said vertical deflection circuit comprises a Miller feedback arrangement.

15. An apparatus according to claim 1 wherein said vertical deflection circuit comprises a first capacitance and a switch coupled to said first capacitance for discharging said capacitance, during a retrace interval, such that a first voltage is developed across said first capacitance prior to each said trace interval, and wherein the proportional difference having the first quantity is determined in accordance with said first voltage.

16. A television deflection apparatus, comprising:
a source of a first supply voltage;
a horizontal deflection circuit coupled to said first supply voltage for generating a horizontal deflection current in a horizontal deflection winding at an amplitude that changes when a change in said first supply voltage occurs;
means for generating a first control voltage that is indicative of an amplitude of said horizontal deflection current and that changes when said change in said horizontal deflection current occurs;
means responsive to said first control voltage for generating a second control voltage having a first portion that changes in accordance with said change in said horizontal deflection current and a second portion that remains substantially constant when said change in said horizontal deflection current occurs; and
a vertical deflection circuit responsive to a second control voltage that varies with the change in said horizontal deflection current for generating a vertical deflection current in a vertical deflection winding at an amplitude that is determined in accordance with the change in said horizontal deflection current such that said second portion of said second control voltage prevents said change in said horizontal deflection current amplitude from causing a change in a horizontal width-to-vertical height ratio of a displayed image.

17. A television deflection apparatus, comprising:
a source of a first supply voltage;
a horizontal deflection circuit coupled to said first supply voltage for generating a horizontal deflection current in a horizontal deflection windng at an amplitude that changes when a change in said first supply voltage occurs;
means for generating a first control voltage that is indicative of an amplitude of said horizontal deflection current and that changes when said change in said horizontal deflection current occurs;
a vertical deflection circuit responsive to a second control voltage that varies with the change in said horizontal deflection current for generating a vertical deflection current in a vertical deflection winding at an amplitude that is determined in accordance with the change in said amplitude of said horizontal deflection current, such that a change in said second control voltage causes said vertical deflection current to proportionally change by an amount that is different from the proportion change in said second control voltage; and
a voltage divider having a first terminal that is coupled to said first control voltage and a second that is coupled to a predetermined third control voltage that is developed across a zener diode for generating said second control voltage at a third terminal of said voltage divider such that when said change in said horizontal deflection current occurs, the proportional change in said second control voltage is different from the proportional change in said horizontal deflection current.

18. A television deflection apparatus, comprising:
a source of a first supply voltage;
a horizontal deflection circuit coupled to said first supply voltage for generating a horizontal deflection current in a horizontal deflection winding at an amplitude that changes when a change in said first supply voltage occurs;
means for generating a first control voltage that is indicative of an amplitude of said horizontal deflection current and that changes when said change in said horizontal deflection current occurs;
a vertical deflection circuit comprising a Miller feedack arrangement and responsive to a second control voltage that varies with the change in said horizontal deflection current for generating a vertical deflection current in a vertical deflection winding at an amplitude that is determined in accordance with the change in said amplitude of said horizontal deflection current, such that a change in said second control voltage causes said vertical deflection current to proportionally change by an amount that is different from the proportional change in said second control voltage; and
means responsive to said first control voltage for generating said second control voltage such that when said change in said horizontal deflection current occurs, the proportional change in said second control voltage is different from the proportional change in said horizontal deflection current.

19. A television deflection apparatus, comprising:

a source of a first supply voltage;

a horizontal deflection circuit coupled to said first supply voltage for generating a horizontal deflection current in a horizontal deflection winding at an amplitude that changes when a change in said first supply voltage occurs;

means for generating a first control voltage that is indicative of an amplitude of said horizontal deflection current and that changes when said change in said horizontal deflection current occurs;

a vertical deflection circuit responsive to a second control voltage that varies with the change in said horizontal deflection current for generating a vertical deflection current in a vertical deflection winding at an amplitude that is determined in accordance with the change in said amplitude of said horizontal deflection current, such that a change in said second control voltage causes said vertical deflection current to proportionally change by an amount that is different from the proportional change in said second control voltage, said vertical deflection circuit comprising differential amplifying means having an output terminal that is coupled to said vertical deflection winding, a sampling resistance coupled to said amplifying means for generating a sawtooth third voltage that is indicative of an amplitude of said vertical deflection current, a first capacitance having a first terminal that is coupled to said sampling resistance and a second terminal that is coupled to a first input terminal of said amplifying means, said amplifying means having a second input terminal that is coupled to said second control voltage and switching means responsive to a signal at a frequency that is related to a vertical deflection frequency for periodically discharging said first capacitance; and means responsive to said first control voltage for generating said second control voltage such that when said change in said horizontal deflection current occurs, the proportional change in said second control voltage is different from the proportional change in said horizontal deflection current.

20. An apparatus according to claim 19 wherein said switching means comprises a diode that is coupled at a first junction terminal between said first capacitance and said sampling resistance.

21. An apparatus according to claim 20 wherein said switching means further comprises a switch coupled to said second terminal of said first capacitance that is remote from said first junction terminal.

22. An apparatus according to claim 19 further comprising, a DC blocking second capacitance coupled to said vertical deflection winding for developing a DC voltage that is coupled to said second terminal of said first capacitance for supplying a current that charges said first capacitance and for providing a DC negative feedback in said vertical deflection circuit.

23. An apparatus according to claim 19 wherein said vertical deflection circuit comprises a Miller feedback arrangement.

* * * * *

UNITED STATES PATENT AND TRADEMARK OFFICE
CERTIFICATE OF CORRECTION

PATENT NO. : 4,843,285

DATED : June 27, 1989

INVENTOR(S) : LIN T. CHIN & JAMES A. WILBER

It is certified that error appears in the above-identified patent and that said Letters Patent is hereby corrected as shown below:

| | |
|---|---|
| Col. 2, line 35 | "01" should be -- Q1 -- |
| Col. 3, line 67 | "©" should be deleted |
| Col. 4, line 60 | "decrese" should be -- decrease -- |
| Col. 5, line 11 | "voltage bQ3" should be -- voltage $V_{bQ3}$ -- |
| Col. 6, line 54 | "siad" should be -- said -- |
| Col. 8, line 30 | after "second" should be -- terminal -- |
| Col. 8, line 51 | "dack" should be -- dback --. |

Signed and Sealed this

Fourteenth Day of January, 1992

Attest:

HARRY F. MANBECK, JR.

*Attesting Officer*     *Commissioner of Patents and Trademarks*